Figure 1:
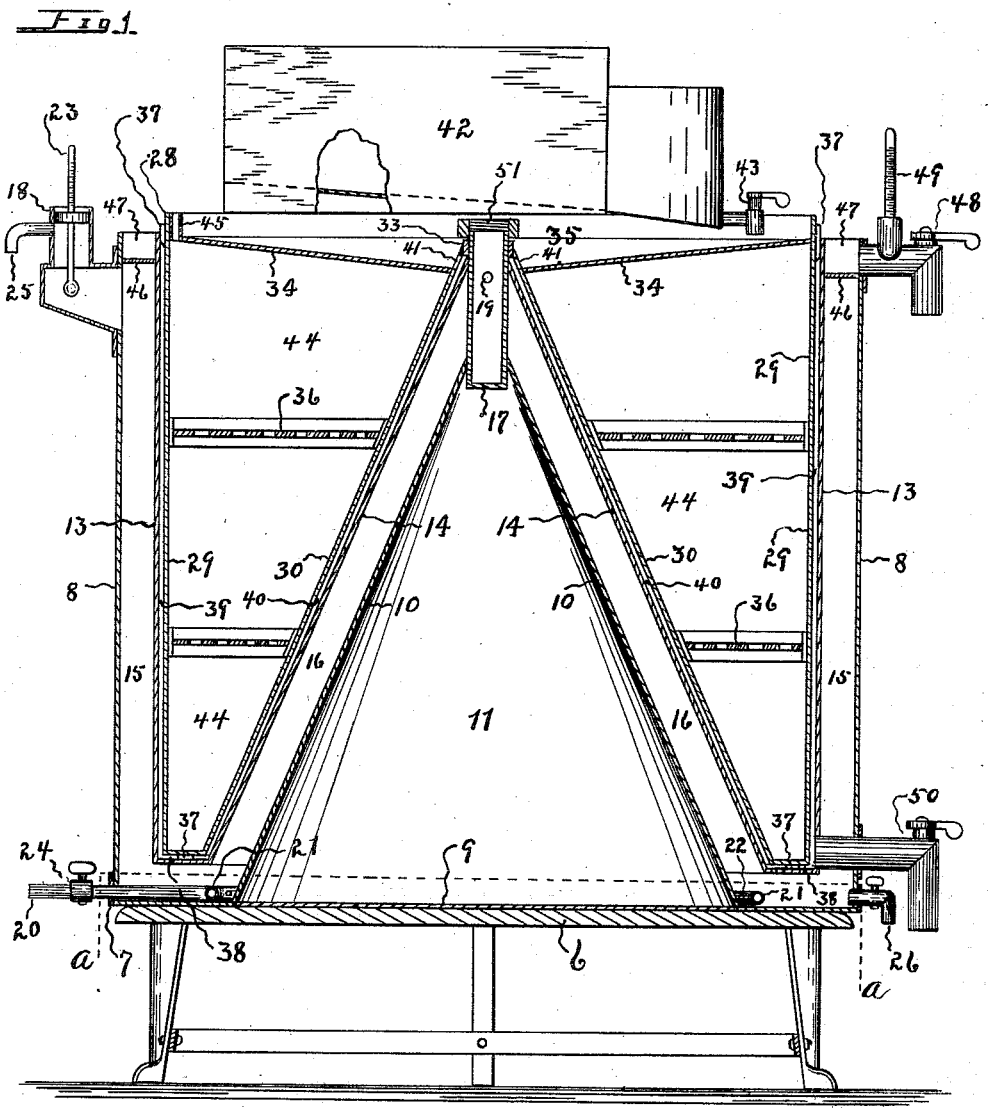

C. N. GILLE.
MILK PASTEURIZER.
APPLICATION FILED OCT. 28, 1910.

995,130.

Patented June 13, 1911.
3 SHEETS—SHEET 1.

Witnesses

Inventor
Charles N. Gille,
By Hiram A. Sturges,
Attorney

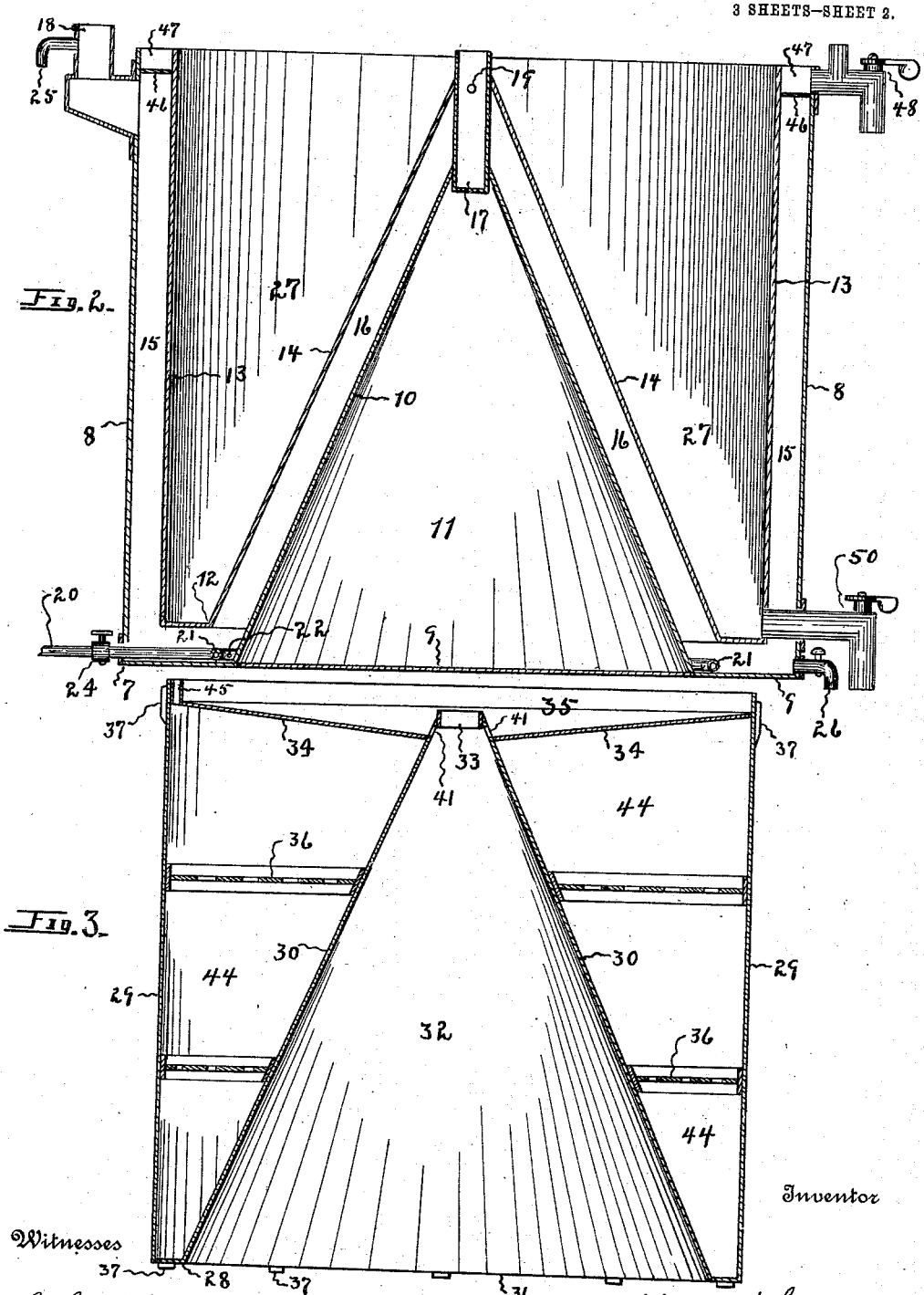

C. N. GILLE.
MILK PASTEURIZER.
APPLICATION FILED OCT. 28, 1910.
995,130.
Patented June 13, 1911.
3 SHEETS—SHEET 3.
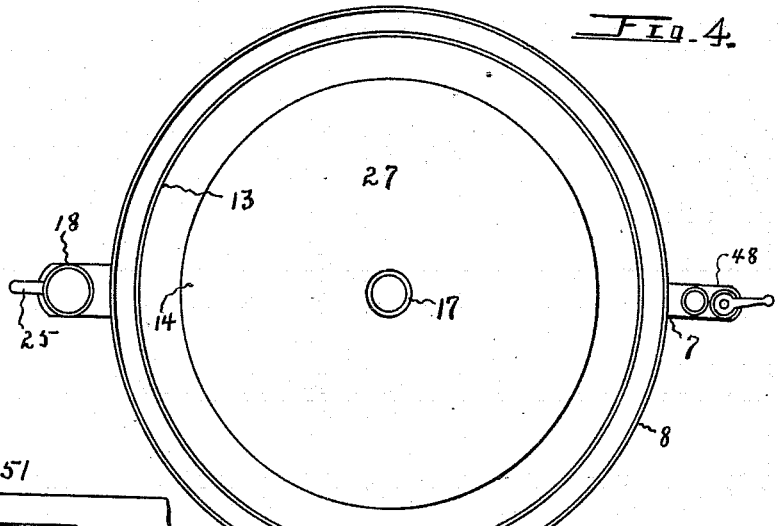
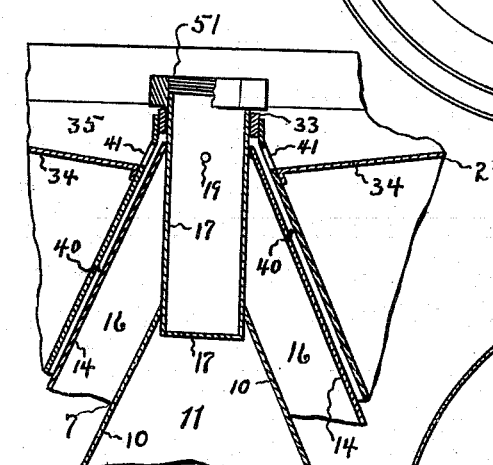
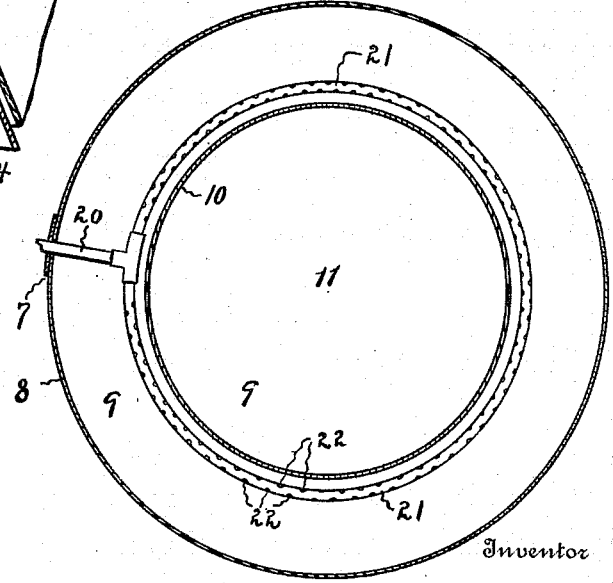
Witnesses
L. L. Sturges
T. Snowden
Inventor
Charles N. Gille,
By Hiram A. Sturges,
Attorney

UNITED STATES PATENT OFFICE.

CHARLES N. GILLE, OF OMAHA, NEBRASKA, ASSIGNOR TO GRAVITY PASTEURIZER COMPANY, OF OMAHA, NEBRASKA, A CORPORATION.

MILK-PASTEURIZER.

995,130. Specification of Letters Patent. Patented June 13, 1911.

Application filed October 28, 1910. Serial No. 589,588.

*To all whom it may concern:*

Be it known that I, CHARLES N. GILLE, a citizen of the United States, residing at Omaha, in the county of Douglas and State of Nebraska, have invented certain new and useful Improvements in Milk-Pasteurizers, of which the following is a specification.

This invention relates to improvements in milk pasteurizers, and has for its object, broadly, to provide an apparatus of this class which will consist of few parts and will be effective for a thorough and rapid pasteurization of milk.

One of the particular objects in view is to provide a construction, by which the milk will be exposed uniformly to the walls of the pasteurizing chamber, so that the usual adhesion or coating of milk upon the heated surface of said walls may be avoided.

Another object is to provide a construction whereby the milk may be partly heated before it is exposed to the heat of the water jacket.

The invention includes the form of a water jacket which may be conveniently heated and found to be particularly effective for producing the required degree of heat with the least amount of water and fuel; and includes the provision of an inclined, aerating passageway for the milk, after it has been heated, by means of which it may be conveniently exposed to the air.

By use of the herein described apparatus, milk may be subjected to 155 degrees of heat, the heat of the water never being over 185 degrees, so that the objectionable coating or adhesive formation of milk will be avoided, and the pasteurization will be quickly effected.

With the above mentioned objects in view and others as hereinafter explained, the invention consists of the novel construction, combination and arrangement of parts as described herein and claimed, and as illustrated in the drawing, it being understood that changes in form, size, proportion and minor details may be made within the scope of the claims, without departing from the spirit of the invention or sacrificing any of its advantages.

In the accompanying drawing which illustrates one embodiment of the invention, Figure 1 is a side view of the pasteurizer in longitudinal section, the milk-feeding tank being partly broken away. Fig. 2 is a view in longitudinal section, of the lower receptacle or water jacket, the perforated steam discharge-pipe also being shown. Fig. 3 is a view in longitudinal section of the upper receptacle or filler-member. Fig. 4 is a plan view, somewhat reduced, of the structure illustrated in Fig. 2, showing the continuous aerating milk passageway. Fig. 5 is a sectional view on line $a\ a$ of Fig. 1, looking to the bottom of the water jacket, showing the perforated steam discharge pipe, or means for heating the water jacket. Fig. 6 is a broken away, enlarged detail relating to Fig. 1, to clearly show formation of the milk-heating chamber and its intakes, the collar of the upper receptacle mounted upon the cylindrical connecting-member or tube-section of the water jacket, and the screw-nut.

Referring now to the drawing for a more particular description, numeral 6 indicates a suitable frame or platform upon which may be seated a receptacle or container 7 having an upright, cylindrical outer wall 8, and a bottom 9; and centrally within the container and secured upon bottom 9 is wall 10 forming a cone-shaped air-chamber 11. Container 7 is also provided with an adjacent, inner receptacle 12 having an upright, cylindrical wall 13 and a central cone-shaped wall 14. By the construction as described, the respective upright and inclined annular chambers 15 and 16 are provided. They communicate at their lower ends and form a single water jacket of substantially W-shape, in cross-section. A centrally disposed cylindrical member or tube-section 17 is employed upon which the upper ends of walls 10 and 14 may be secured, said tube-section having an open, upper terminal.

The water jacket may be filled by use of its intake 18, secured upon the upper end of wall 8, the air within chamber 16 at this time escaping from vent apertures 19 formed in tube-section 17 and communicating with the water jacket; and the water may be heated by means of steam pipe 20, its discharge being the coil 21 disposed within and upon the bottom of the water jacket, said coil circumscribing wall 10 and formed with numerous perforations 22. Perforations 22 are formed in the opposite horizontal sides of coil 21 and steam will pass into the water with considerable force; and since it is directed horizontally it will not operate to move the water upwardly of the water jacket as would be the case if the perforations were formed in the upper side of the coil. The discharge of steam thus distributed and applied in the bottom of the water jacket is very effective and causes the water to become quickly heated.

The degree of heat of the water may be ascertained by a thermometer 23 inserted in intake 18, heat from steam pipe 20 being under control of valve 24, and in operation the water is prevented from attaining a degree of heat which would be injurious to the milk, or to cause coatings to form upon the surfaces containing the milk. Condensed air from the steam may escape through apertures 19 and escape-pipe 25, this pipe being located at the intake at an altitude above the water-level of the water jacket.

At 26 is shown a draw-off cock, by means of which the water jacket may be emptied when desired.

Air chamber 11 provides a space to contain heated air. It prevents exterior cool air coming in contact with wall 10 of the water jacket, and thereby aids the operation of heating the water jacket.

The parts thus described relate to the form and construction of the water jacket, means for heating the water therein, testing the heat of the water, and a control of the heat to be applied. It will be noted that an annular chamber 27 is formed in container 7, said chamber having an inclined inner wall 14 and an upright, outer wall 13. Within chamber 27 may be removably seated the upper receptacle 28. Receptacle 28 has a cylindrical, upright wall 29; and it has a cone-shaped, inner wall 30 opening upon its bottom 31, and thereby forming the cone-shaped chamber 32. The upper terminal of wall 30 is secured upon collar 33 disposed at a lower altitude than the upper end of wall 29; and I provide the downwardly inclined, annular partition 34, its outer edge being secured upon and near the upper terminal of wall 29, its inner edge being secured to wall 30 adjacent to collar 33 to form a bottom for the milk-receiving pan 35. At 36 are indicated perforated, reinforcing partitions extending between and secured upon walls 29 and 30, for the purpose of causing the receptacle to maintain a uniform diameter, and at 37 are indicated spacing-lugs, the same being secured at intervals upon the bottom and sides of said receptacle. The diameter of wall 29 of receptacle 28 is somewhat less than the diameter of wall 13 of the water jacket, and the diameter of its cone-shaped wall 30 is greater than the diameter of wall 14 of the jacket, and when receptacle 28 is seated within chamber 27 of receptacle 7, the outer and inner walls of receptacle 28 will be disposed adjacent to walls 13 and 14, respectively, of the water jacket to provide therebetween the attenuated milk-pasteurizing chamber 38, said chamber comprising the upright, annular portion 39 and the inclined, annular part 40, and in cross-section, being substantially of W-shape. When the upper receptacle is seated in the lower receptacle, the pasteurizing chamber will be of uniform width, since lugs 37 are of uniform thickness, and make contact with the walls of the water jacket as shown in Fig. 1, collar 33 circumscribing the upper end of tube-section 17, centrally of the water jacket. Wall 30, near collar 33, is provided with apertures 41 to form a milk intake for chamber 38.

At 42 is indicated a milk tank removably seated upon the top of receptacle 28. The discharge cock 43 of this tank is disposed in close proximity to the depressed bottom 34 of pan 35, and during operation, milk will pass as a sheet upon this bottom on account of the force of its movement, and the volume of milk will move circularly, since the bottom is of funnel shape.

It will be understood that an air chamber 44 is formed by walls 29, 30 and 34 of receptacle 28, and that this chamber will contain heated air by reason of the close proximity of its walls 29 and 30 to the water jacket, expanded air escaping through port 45 formed in bottom 34 of milk-receiving pan 35. On account of this heat, the milk within pan 35 may become partly heated before it passes through apertures 41, this being an advantage, since pasteurization is thereby effected gradually.

Near the upper end of receptacle 7, between walls 8 and 13 is secured the transverse, annular, inclined strip 46 to form the inclined, aerating passageway 47. Receptacle 28 has an adequate height to project somewhat above receptacle 7 when seated therein, and during operation, milk within member 35 has an altitude above the upper end of wall 13, with the result that the pasteurizing chamber will be completely filled; and milk, under control of faucet 43 will move uniformly through and become pasteurized within said chamber, and will be discharged within passageway 47 by passing over the upper edge of wall 13.

At 48 is indicated a faucet for drawing the pasteurized milk. It is provided with a thermometer 49 for ascertaining the temperature of the milk, and its pipe communicates with the lowest part of inclined passageway 47.

Among the advantages afforded by the construction as described, may be mentioned the fact that the steam discharge pipe does not make contact with the wall of the pasteurizing chamber, the water in the jacket being the medium for communicating the heat. Also the milk, during pasteurization, is exposed to the heat, as a moving sheet of substantially uniform thickness. In the present construction, the manner of applying the heat tends to provide a more uniform degree of temperature for the heating surfaces of the pasteurizer than in structures where the milk is conveyed in troughs or deep passageways. The construction provides means for the support of two annular columns of milk during its treatment, these columns being of considerable, comparative, depth, and at the lower parts of the columns the milk is, obviously, subjected to pressure tending to exclude the air, and thereby aiding the process of pasteurization. Also, since cool air is excluded from contact with the walls which form the pasteurizing chamber, a less degree of heat will be required for heating said walls. The construction provides an apparatus of compact form, by means of which a large quantity of milk may be rapidly pasteurized. In practice, a uniform supply of milk passes from tank 42 to pan 35 under control of faucet 43, above mentioned, and the milk has a uniform movement through the pasteurizing chamber, passageway 47 and faucet 48. Tank 42 may be refilled as often as desired to provide the supply, and in practice, regardless of the quantity of milk pasteurized, it does not adhere to the heated surfaces of the pasteurizing chamber.

At 50 is indicated a draw-off faucet, the pipe of which extends through the water jacket and is in communication with the lowest part of the pasteurization chamber, and by means thereof, milk may be drawn from said chamber and pan 35, after a supply of milk has been pasteurized.

At 51 is indicated a screw-nut which may be mounted upon the upper terminal of tube-section 17. It may make contact with collar 33 to prevent an upward movement, during operation, of the upper receptacle. The tendency of the heated milk in the pasteurizing chamber, from expansion, tends to elevate the upper receptacle from the water jacket, and the use of the screw nut prevents said movement or elevation. In addition to the expansion of heated milk there is an upward pressure caused by the buoyancy of the upper receptacle. It will be understood that both of the receptacles are preferably constructed of sheet metal, so that they may be economically manufactured and will be of comparatively light weight. The upper receptacle, when the pasteurizing chamber has been filled, is pressed upward with great force, and means are required for securing the receptacles together to resist said pressure, and the screw nut mounted as described is adequate for this purpose. The upper receptacle may be readily removed from the lower receptacle for the purpose of washing the milk from their walls, and this operation is quite necessary for sanitary reasons. After screw-nut 51 has been removed from the end of pipe-section 17, the upper receptacle may be lifted or moved upwardly, collar 33 sliding from member 17, and lugs 37 will become disengaged from their contact with the lower receptacle.

It will be noted that by reason of the attenuated form of the annular, cone-shaped portion 16 of the water jacket, this part of the jacket may become more readily heated than it would be if wall 10 was removed and air-chamber 11 omitted in the construction.

The usefulness of the pasteurizer as shown, resides largely in the fact that the heated surfaces of the pasteurizing chamber do not become coated with the casein or other parts of the milk, this being due, in part, to the presentation of a moving sheet of milk under pressure, and to the gradual heating of the milk. The degree of temperature of the milk in the upper part of portion 40 of the pasteurizing chamber is never as great as in other parts thereof, for the reason that it is near apertures 41. Also as has been mentioned, the milk becomes partly heated in the basin or pan 35 before it passes through apertures 41.

The apparatus as described may be used to advantage for other purposes than for the treatment of milk, and I do not limit myself to the uses above mentioned.

Having fully described the several parts of the pasteurizer, a further explanation relating to operation is not necessary.

What I claim as new and desire to secure by Letters Patent is,—

1. A milk pasteurizer, consisting of a first receptacle provided with a water jacket comprising an upright, annular compartment and a central, annular cone-shaped compartment having its lower end opening upon said upright annular compartment; a second receptacle having a cylindrical wall and a central, cone-shaped wall; said second receptacle adapted to be removably seated in the first receptacle, its cylindrical wall and cone-shaped wall being disposed adjacent to the respective walls of the cylindrical compartment and cone-shaped compartment of said water jacket and forming therebetween a pasteurizing chamber; means to pass a quantity of milk through said chamber, and means to communicate heat to said chamber.

2. A milk pasteurizer, comprising, in combination with a water jacket formed as an annular, cone-shaped portion and an upright annular portion circumscribing and opening at its lower end upon the lower end of the cone-shaped portion; means communicating with said water jacket for heating the same; a receptacle having a central cone-shaped wall and an upright, cylindrical wall circumscribing said cone-shaped wall, said receptacle adapted to be disposed with its cylindrical wall disposed inwardly of and adjacent to the upright annular portion of the water jacket and forming therebetween a first chamber-portion; the cone-shaped wall of said receptacle circumscribing the cone-shaped portion of said water jacket and forming therebetween a second chamber-portion in communication with said first chamber-portion; and means to pass a quantity of milk through said chamber-portions.

3. A milk pasteurizer, consisting of a first receptacle provided with a water jacket; said jacket comprising an upright, annular compartment provided at its upper end with an intake port, and a central annular cone-shaped compartment having its lower end opening upon said cylindrical compartment, and provided at its upper end with an exit-port; a second receptacle having a cylindrical wall and a central cone-shaped wall; said second receptacle adapted to be removably seated in the first receptacle, its cylindrical wall and cone-shaped wall being disposed adjacent to the respective walls of the cylindrical compartment and cone-shaped compartment of the water jacket and forming therebetween a pasteurizing chamber; means to pass a quantity of milk through said chamber; and a discharge pipe arranged to convey a heating element and disposed within said water jacket, said discharge pipe being formed as a loop and provided at longitudinal intervals with oppositely-disposed perforations.

4. A milk pasteurizer, comprising a cone-shaped, annular compartment and an upright, annular compartment circumscribing and communicating therewith to provide a water jacket; means to communicate heat to said water jacket; a cylindrical receptacle having an interior wall of cone shape with a terminal reinforcing collar, its upright wall and bottom being provided with spacing-lugs; said receptacle adapted to be disposed between the upright and cone-shaped compartments of the water jacket, its collar bearing upon the upper end of the cone-shaped compartment, the spacing lugs of said receptacle making contact with the water jacket and forming, in cross-section, between said water jacket and the walls of the receptacle a W-shaped, attenuated pasteurizing chamber; and means to pass a quantity of milk through said pasteurizing chamber.

5. A milk pasteurizer, comprising a cone-shaped, annular compartment having a vent-aperture, and an upright, annular compartment having an intake, said upright compartment circumscribing and communicating at its bottom with the cone-shaped compartment to provide a water jacket of W-shape, in cross section; a perforated, tubular member formed as a loop and disposed in said water jacket; means to pass a heating element through said tubular member; a cylindrical receptacle having an interior wall of cone shape with a terminal reinforcing collar, its upright wall and bottom being provided with spacing-lugs; said receptacle adapted to be disposed between the upright and cone-shaped compartments of the water jacket, its collar bearing upon the upper terminal of the cone-shaped compartment, the spacing-lugs of said receptacle making contact with the water jacket and forming, in cross-section, between said water jacket and the walls of the receptacle a W-shaped, attenuated pasteurizing chamber; and means to pass a quantity of milk through said pasteurizing chamber.

6. A milk pasteurizer, comprising a cone-shaped, annular compartment having a vent-aperture, and an upright, annular compartment having an intake, said upright compartment circumscribing and communicating at its bottom with the cone-shaped compartment to provide, in cross-section, a water-jacket of W-shape; an aerating milk passageway formed upon the upper terminal and disposed in the plane of said upright compartment; a perforated, tubular member formed as a loop and disposed in said water jacket; means to pass a heating element through said tubular member; a cylindrical receptacle having an interior wall of cone shape with a terminal reinforcing collar, its upright wall and its bottom being provided with spacing lugs; said receptacle adapted to be disposed between the upright and cone-shaped compartments of the water jacket, its collar circumscribing the upper terminal of the cone-shaped compartment, and forming, in cross-section, between said water jacket and the walls of the receptacle, an attenuated, W-shaped pasteurizing chamber in communication with said aerating milk passageway; a compression-member having a threaded connection with the upper terminal of the cone-shaped compartment of the water jacket and bearing upon the collar of the cone-shaped wall of the cylindrical receptacle for maintaining an engagement of the spacing-lugs with the water jacket; and means to pass a quantity of milk through said pasteurizing chamber.

7. A sterilizer for liquids, comprising an annular, upright water jacket formed substantially W-shaped in cross-section and provided with an intake; an inclined, annular, aerating passageway upon the outermost annular part of the water jacket provided with a discharge port at its point of lowest inclination; heat-testing devices provided, respectively, for the intake of the water jacket and the discharge port of the aerating passageway; means to communicate heat to said water jacket; a cylindrical receptacle having a cone-shaped bottom, its top being provided with a feeding-pan; said receptacle adapted to be mounted upon said water jacket to form between said water jacket and the walls of the receptacle, in cross-section, an attenuated W-shaped sterilizing chamber in communication, respectively, with said feeding-pan and with said inclined, annular, aerating passageway; and means to pass a liquid through said sterilizing chamber.

In testimony whereof I have affixed my signature in presence of two witnesses.

CHARLES N. GILLE.

Witnesses:
HIRAM A. STURGES,
E. L. HUMPHREY.

Copies of this patent may be obtained for five cents each, by addressing the "Commissioner of Patents, Washington, D. C."